United States Patent
Brereton et al.

(10) Patent No.: US 10,346,745 B2
(45) Date of Patent: *Jul. 9, 2019

(54) METHOD OF USING GRAPHICAL INDEX MAPS TO PROVIDE AUTOMATED RELATIONSHIP DISCOVERY AND IMPACT ANALYSES

(71) Applicant: International Business Machines Corporation, Armonk, NY (US)

(72) Inventors: JoAnn P Brereton, Hawthorne, NY (US); Eoin Lane, Littleton, MA (US); Ke Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/018,872

(22) Filed: Sep. 5, 2013

(65) Prior Publication Data
US 2015/0066827 A1 Mar. 5, 2015

(51) Int. Cl.
*G06F 17/00* (2019.01)
*G06N 5/02* (2006.01)
*G06F 3/0484* (2013.01)

(52) U.S. Cl.
CPC ............ *G06N 5/02* (2013.01); *G06F 3/04842* (2013.01)

(58) Field of Classification Search
CPC .................................. G06N 5/02; G06F 17/30
See application file for complete search history.

(56) References Cited

U.S. PATENT DOCUMENTS

| | | |
|---|---|---|
| 6,351,715 B1 | 2/2002 | Ykema |
| 7,467,145 B1 | 12/2008 | Castellanos et al. |
| 7,664,712 B1 | 2/2010 | Duvall et al. |
| 7,962,589 B1 | 6/2011 | Parello et al. |
| 8,051,164 B2 | 11/2011 | De Peuter et al. |
| 8,301,755 B2 | 10/2012 | De Peuter et al. |
| 8,645,904 B2 | 2/2014 | Coldicott et al. |
| 9,123,004 B2 | 9/2015 | Coldicott et al. |
| 9,535,978 B2 | 1/2017 | Coldicott et al. |

(Continued)

FOREIGN PATENT DOCUMENTS

| | | |
|---|---|---|
| WO | 0042529 A1 | 7/2000 |
| WO | 2011065969 A2 | 6/2011 |

(Continued)

OTHER PUBLICATIONS

Fakcharoenphol, J., et al. "Planar graphs, negative weight edges, shortest paths, and near linear time." Foundations of Computer Science, 2001. Proceedings. 42nd IEEE Symposium on. IEEE, 2001.*

(Continued)

*Primary Examiner* — Eric Nilsson
(74) *Attorney, Agent, or Firm* — Brown & Michaels, PC; David Woycechowsky

(57) ABSTRACT

A method, system and computer-usable medium are disclosed for understanding and discovering relationships within infrastructure systems via an infrastructure management system. In certain embodiments, the infrastructure systems comprise water and/or transportation systems. Such an infrastructure management system enables accidents to be prevented, traffic to flow normally, water to be conserved, cleaned and delivered safely.

11 Claims, 6 Drawing Sheets

(56) References Cited

U.S. PATENT DOCUMENTS

| | | | |
|---|---|---|---|
| 2004/0034652 A1 | 2/2004 | Hofmann et al. | |
| 2004/0093344 A1 | 5/2004 | Berger et al. | |
| 2005/0289166 A1 | 12/2005 | Stanley et al. | |
| 2006/0190368 A1 | 8/2006 | Kesterman | |
| 2007/0006177 A1* | 1/2007 | Aiber et al. | 717/136 |
| 2007/0027666 A1* | 2/2007 | Frankel | E21B 43/00 703/10 |
| 2007/0074076 A1 | 3/2007 | Imai et al. | |
| 2007/0130231 A1 | 6/2007 | Brown et al. | |
| 2007/0288219 A1 | 12/2007 | Zafar et al. | |
| 2008/0033993 A1 | 2/2008 | Uceda-Sosa | |
| 2008/0125942 A1 | 5/2008 | Tucker et al. | |
| 2008/0307523 A1 | 12/2008 | Subramanyam et al. | |
| 2009/0044129 A1 | 2/2009 | Ebrom et al. | |
| 2009/0157419 A1 | 6/2009 | Bursey | |
| 2009/0248488 A1 | 10/2009 | Shah et al. | |
| 2009/0287674 A1 | 11/2009 | Bouillet et al. | |
| 2009/0299696 A1 | 12/2009 | Shiihara et al. | |
| 2009/0327242 A1 | 12/2009 | Brown et al. | |
| 2010/0049564 A1 | 2/2010 | Lewis et al. | |
| 2010/0100546 A1 | 4/2010 | Kohler | |
| 2010/0162401 A1 | 6/2010 | Sakaki | |
| 2010/0228693 A1 | 9/2010 | Dawson et al. | |
| 2011/0099050 A1 | 4/2011 | Coldicott et al. | |
| 2011/0099139 A1 | 4/2011 | Coldicott et al. | |
| 2011/0099536 A1 | 4/2011 | Coldicott et al. | |
| 2011/0153636 A1 | 6/2011 | Coldicott et al. | |
| 2011/0169835 A1* | 7/2011 | Cardno et al. | 345/440 |
| 2012/0016858 A1 | 1/2012 | Rathod | |
| 2012/0102050 A1 | 4/2012 | Button et al. | |
| 2012/0102371 A1 | 4/2012 | Tonouchi | |
| 2012/0155715 A1 | 6/2012 | Buscema | |
| 2012/0278353 A1 | 11/2012 | Carrato et al. | |
| 2013/0173523 A1* | 7/2013 | Sanchez | G06N 5/02 706/50 |
| 2013/0262367 A1 | 10/2013 | Coldicott et al. | |
| 2013/0332240 A1 | 12/2013 | Patri et al. | |
| 2014/0280228 A1 | 9/2014 | Coldicott et al. | |
| 2014/0282404 A1 | 9/2014 | Gonsalves et al. | |
| 2014/0344555 A1* | 11/2014 | Ramanarayanan et al. | 712/222 |
| 2015/0066827 A1 | 3/2015 | Brereton et al. | |
| 2015/0081689 A1 | 3/2015 | Marshall | |
| 2015/0178300 A1 | 6/2015 | Roy et al. | |
| 2016/0247246 A1 | 8/2016 | Bluestone et al. | |

FOREIGN PATENT DOCUMENTS

| | | |
|---|---|---|
| WO | 2011065969 A3 | 6/2011 |
| WO | 2012106922 A1 | 8/2012 |
| WO | 2013138969 A1 | 9/2013 |
| WO | 2013159639 A1 | 10/2013 |

OTHER PUBLICATIONS

Becker, T., et al. "Semantic 3D modeling of multi-utility networks in cities for analysis and 3D visualization". (2012). [retrieved from <http://www.mediatum.ub.tm.de>]. [retrieved Feb. 14, 2017].*

Corbo, J., et al. "An economically-principled generative model of AS graph connectivity." INFOCOM 2009, IEEE. IEEE, 2009.*

Zhang, Q., et al. "Cloud computing: state-of-the-art and research challenges." Journal of internet services and applications 1.1 (2010): 7-18.*

Kehoe, Michael, et al. "Smarter cities series: a foundation for understanding IBM smarter cities." Redguides for Business Leaders, IBM (2011).*

Schaefer et al., Smarter City Series: Understanding the IBM approach to Traffic Management, 2011, http://ip.com/pdf/redbook/REDP473700.pdf.

Le Grand et al., Topic Maps, RDF Graphs and Ontologies Visualization, Jan. 1, 1999, http://www-rp.lip6.fr/~blegrand/Publis/VSW_book.pdf.

Ruther et al. "SNS Environmental Vocabulary—from Terms to Ontology", Semantics 2006 Vienna, Nov. 28-30, 2006.

Ruther, "Sharing Environmental Vocabulary", EnviroInfo 2004 (Geneva), p. 293-295, 18th International Conference "Infomatics for Environmental Protection", Geneva 2004.

Kim et al, "Cause-and-Effect Function Analysis", Proceedings of the 2010 IEEE ICMIT.

Potgieter et al, "Adaptive Bayesian agents: Enabling distributed social networks", S. Afr.J.Bus.Manage.2006, 37(1).

Reusch et al, "Integrated Tool Sets for Business Games and Simulation", Computing, 2008, vol. 7, Issue 2, 59-65.

Rouse, "Topic Map Query language (TMQI)", Sep. 2005.

Lacher, M. S. "On the Integration of Topic Maps and RDF Data", Extreme Markup Languages 2001; Montréal, Québec; Aug. 2001.

Weighted edges in topic maps, Google Forum Groups; retrieved from https://groups.google.com/forum/?fromgroups#!topic/ontopia/cBZqr73vOaI; Oct. 2010.

Heidinger et al. "Towards Collaborative Web-Based Impact Assessment", Proceedings of the 10th Annual International Conference on Digital Government Research: Social Networks: Making Connections between Citizens, Data and Government pp. 190-198; 2009.

Bailey et al. "Flavours of XChange, a Rule-Based Reactive Language for the (Semantic) Web", Rules and Rule Markup Languages for the Semantic Web; vol. 3791 of the series Lecture Notes in Computer Science pp. 187-192; Nov. 2005.

U.S. Appl. No. 13/433,384; Non-Final Rejection dated May 1, 2014.
U.S. Appl. No. 13/433,384; Final Rejection dated Sep. 10, 2014.
U.S. Appl. No. 13/433,384; Non-Final Rejection dated Dec. 24, 2014.
U.S. Appl. No. 14/293,292; Non-Final Rejection dated Feb. 25, 2016.
U.S. Appl. No. 14/081,241; Non-Final Rejection dated Sep. 3, 2015.
U.S. Appl. No. 14/081,241; Final Rejection dated Mar. 11, 2016.
U.S. Appl. No. 14/949,981; Non-Final Rejection dated May 20, 2016.

Hunter, J. "MetaNet a Metadata Term Thesaurus to Enable Semantic Interoperability Between Metadata Domains", Journal of Digital Information, vol. 1, No. 8, 2001.

U.S. Appl. No. 14/081,241:Non-Final Rejection dated Sep. 20, 2016.
U.S. Appl. No. 14/949,981; Final Rejection dated Oct. 20, 2016.
U.S. Appl. No. 14/081,241; Final Rejection dated Feb. 22, 2017.
U.S. Appl. No. 14/867,156; Non Final Rejection dated Oct. 6, 2017.
U.S. Appl. No. 14/081,241; Non-Final Rejection dated Aug. 16, 2017.
U.S. Appl. No. 14/949,981; Non-Final Rejection dated Nov. 20, 2017.
U.S. Appl. No. 14/081,241; Final Rejection dated Mar. 7, 2018.
U.S. Appl. No. 14/949,981; Final Rejection dated Apr. 6, 2018.

* cited by examiner

METHOD OF USING GRAPHICAL INDEX MAPS TO PROVIDE AUTOMATED RELATIONSHIP DISCOVERY AND IMPACT ANALYSES

BACKGROUND OF THE INVENTION

Field of the Invention

The present invention relates in general to the field of computers and similar technologies, and in particular to software utilized in this field. Still more particularly, it relates to a method, system, and computer-usable medium for using graphical index maps to provide automated relationship discovery and impact analysis.

Description of the Related Art

In infrastructure systems such as underground water and sewer systems and transportation systems, physical connections between equipment and conduits exist. For example, water and sewer systems have junctions that are connected via pipes. Also for example, municipality transportation systems have roads that meet at intersections to form a road network.

Physical systems also can be described via logical and abstract relationships. For example, a set of pressure valves within a water delivery system may belong to a particular pressure management zone. Likewise, a set of traffic signals within a road network may be related through a timing mechanism that synchronizes the green and red signals to control the flow of traffic. In these same systems, in addition to having static relationships, there are ongoing dynamic relationships that are desirable to manage. It is desirable for traffic controllers to understand the logical relationship between how traffic can change due to conditions that arise over time. For instance, if there is an accident at a particular location (e.g., Maple Avenue and Main Street), is there going to be an impact to traffic flowing through a particular intersection (e.g., the intersection of Main Street and Oak Place)? Similarly, in a water management system located at a particular location, could a sewer blockage have adverse impact to water flowing at some distance away? These are relationships it is desirable for water and transportation managers to understand and to help identify problems that might need to be addressed.

Infrastructure system managers such as transportation and water system managers should, on a day-to-day basis, be able to understand both the physical and logical relationships between and among the equipment and areas they manage. Additionally, these managers should be able to discover and prevent problems from happening.

Managing transportation and water systems with online systems typically involve multiple data and inventory systems. There are Supervisory Control and Data Acquisition (SCADA) systems that control and store instrumentation readings from equipment in the field. There are Enterprise Asset Management (EAM) systems to manage the inventory and periodic servicing of equipment in the field. Geographic Information Systems (GIS) provides spatial mapping of assets and networks. A Customer Relationship Management (CRM) system provides information concerning customer accounts, for instance a water company lists households and water meters measuring household water usage. Each of these systems provides logical relationship information relevant to its particular domain.

SUMMARY OF THE INVENTION

In one embodiment, the invention relates to a computer-implemented method for managing an infrastructure system, comprising: generating a topic map for the infrastructure system, the generating being performed dynamically based upon any changes within the infrastructure system; searching the topic map to identify an interested element within the topic map; selecting the interested element, the selecting accessing information regarding an occurrence of the interested element; and, performing an impact analysis on interested element of the topic map.

In another embodiment, the invention relates to a system comprising: a processor; a data bus coupled to the processor; and a computer-usable medium embodying computer program code. The computer program code is used for managing an infrastructure system and comprises instructions executable by the processor and configured for: generating a topic map for the infrastructure system, the generating being performed dynamically based upon any changes within the infrastructure system; searching the topic map to identify an interested element within the topic map; selecting the interested element, the selecting accessing information regarding an occurrence of the interested element; and, performing an impact analysis on interested element of the topic map.

In another embodiment, the invention relates to a non-transitory, computer-readable storage medium embodying computer program code. The computer program code comprises computer executable instructions configured for: generating a topic map for the infrastructure system, the generating being performed dynamically based upon any changes within the infrastructure system; searching the topic map to identify an interested element within the topic map; selecting the interested element, the selecting accessing information regarding an occurrence of the interested element; and, performing an impact analysis on interested element of the topic map.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
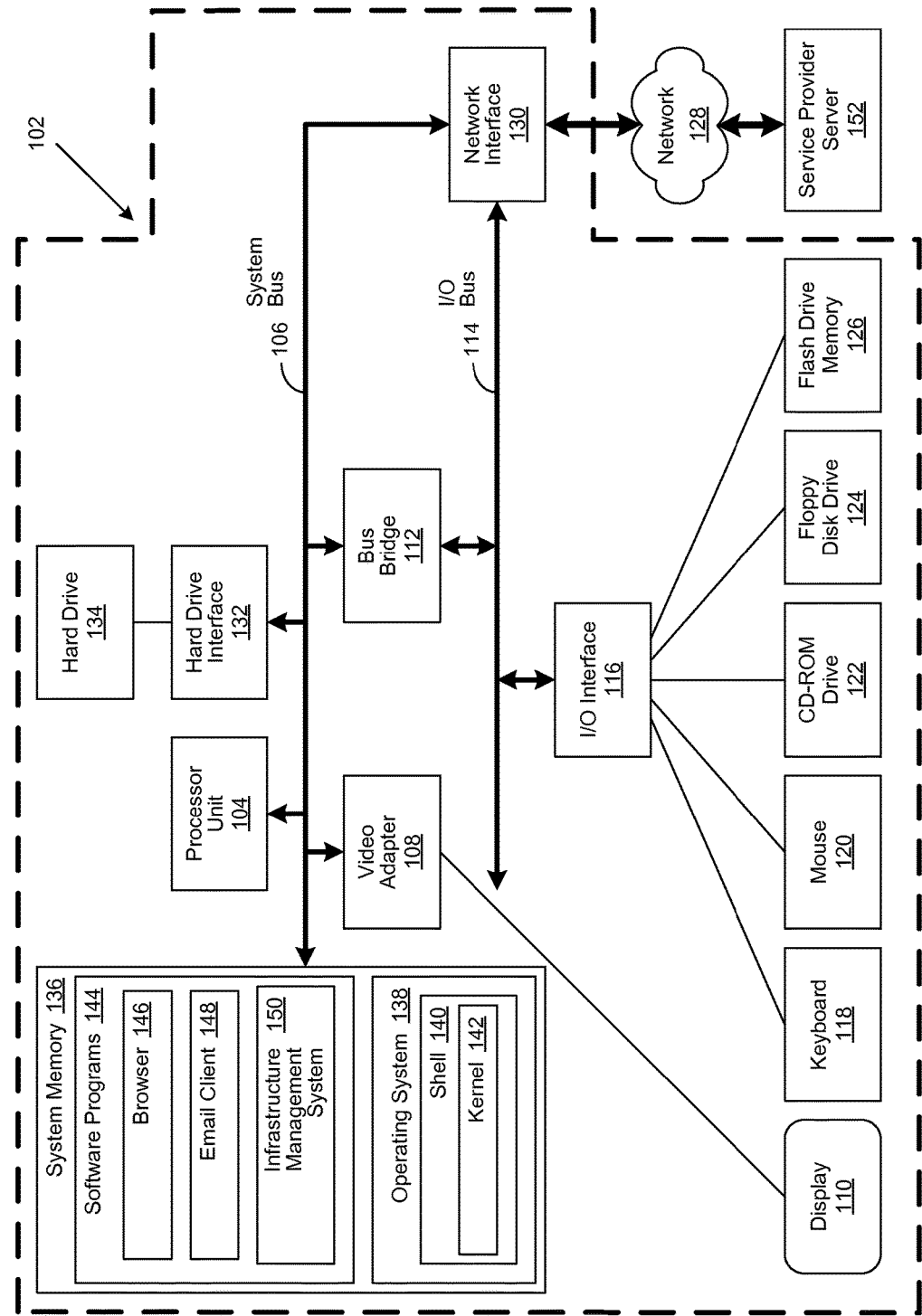
FIG. 1 shows an exemplary client computer in which the present invention may be implemented.

A method, system and computer-usable medium are disclosed understanding and discovering relationships within infrastructure systems via an infrastructure management system. In certain embodiments, the infrastructure systems comprise water and/or transportation systems. Such an infrastructure management system enables accidents to be prevented, traffic to flow normally, water to be conserved, cleaned and delivered safely.

In various embodiments, the method, system and computer-usable medium provides an automated way to represent both physical and logical relationships in infrastructure systems. More specifically, in certain embodiments, an infrastructure system is represented via a management dashboard of the infrastructure management system logically, contextually and geographically. Additionally, in certain embodiments, the infrastructure management system also comprises a discovery mechanism so that managers can see relationships that might run deeper than is obviously evident from a first order view of the system. Additionally, in certain embodiments, the infrastructure management system comprises an impact analysis portion which facilitates understanding the impact of actions upon the managed infrastructure system.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include an infrastructure management system 150. In these and other embodiments, the infrastructure management system 150 includes code for implementing the processes described hereinbelow. In one embodiment, client computer 102 is able to download the infrastructure management system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
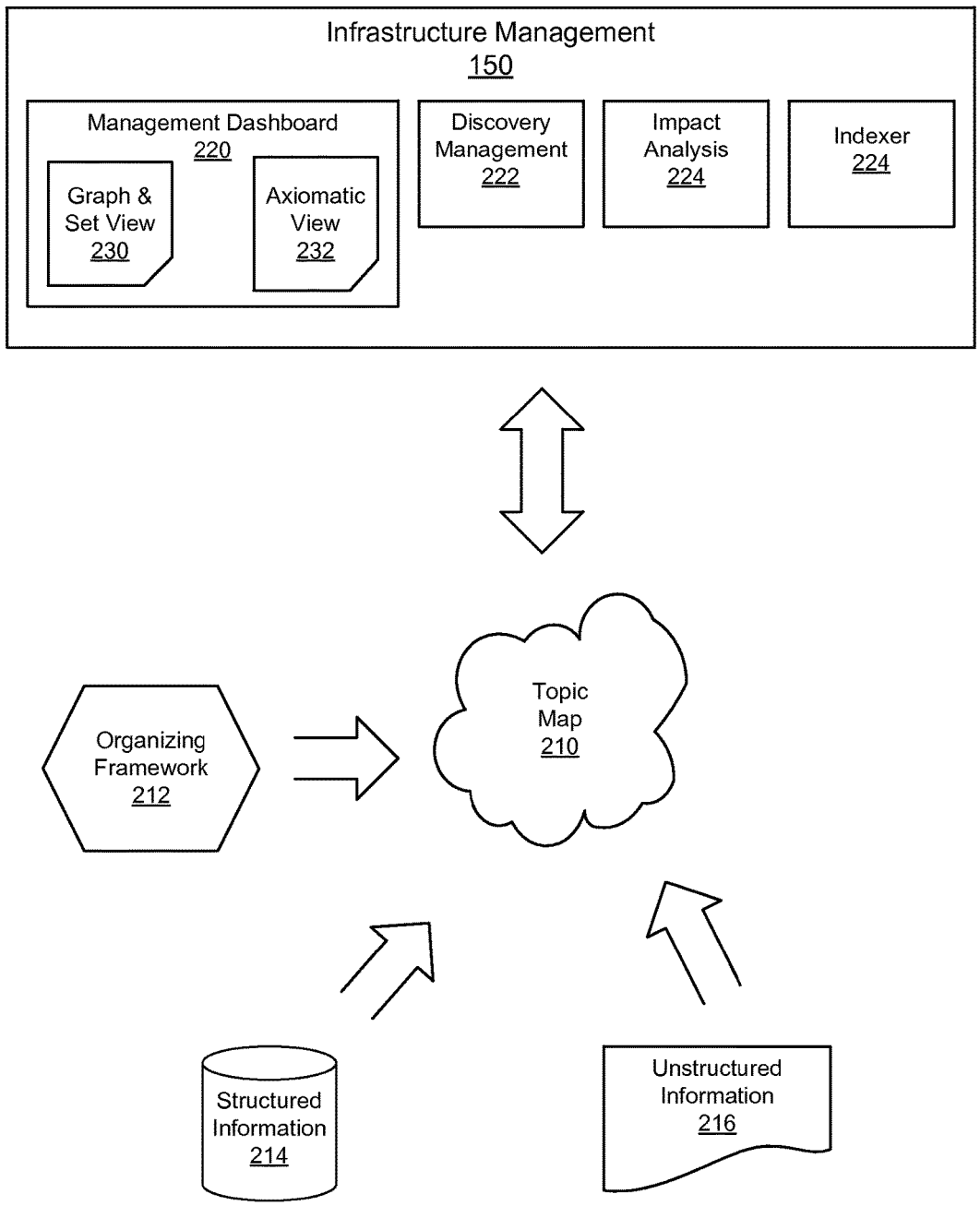
FIG. 2 is a simplified block diagram of an infrastructure management system.

FIG. 2 is a simplified block diagram of an infrastructure management environment 200. More specifically, the infrastructure management environment 200 includes the infrastructure management system 150 which interacts with a topic map 210 of an infrastructure. The topic map 210 is a standard form of representation and interchange of knowledge. A topic map is often used to organize content within a content management system (such as the infrastructure management system 150) in place of folder hierarchies The infrastructure management system 150 uses a standards based meta module to dynamically index, aggregate and integrate structured infrastructure information 214 and unstructured infrastructure information 216 across different domains and sources into a topic map 210. In certain embodiments, the topic map conforms to a standard such as the ISO/IEC 13250:2003. The topic map 210 is generated based upon information from an organizing framework 212 as well as structured infrastructure information 214 and unstructured infrastructure information 216. The topic map 210 represents information using topics, associations and occurrences. Topics represent any concept such as infrastructure elements, people, countries, organizations, software modules, individual files, events, etc. An association represents relationships between topics such as hypergraph relationships. An occurrence represents information resources relevant to a particular topic.

The infrastructure management system 150 includes a management dashboard module 220, a discovery management module 222, an impact analysis module 224, and an indexer 226. The management dashboard module 220 includes a graph & set view module 230 and an axiomatic view module 232. The management dashboard module 220 provides an automated way to represent both physical and logical relationships in infrastructure systems. More specifically, in certain embodiments, an infrastructure system is represented (e.g., on a display such as display 110) via the management dashboard module 220 logically, contextually and geographically. The discovery management module 222 allows managers to see relationships that might run deeper than is obviously evident from a first order view of the system. The impact analysis module 224 facilitates understanding the impact of actions or events upon the managed infrastructure system.

In certain embodiments, the topic map is processed as a mathematical graph. The infrastructure management system 150 performs impact analysis and network optimization using graph theory operations via the impact analysis module 224. The topic map includes support for scope that allows the infrastructure management system 150 to filter, rank and select content within the topic map based on context.

The topic map 210 may be converted into a semantic web technology (such as a web ontology language (OWL) such as OWL-DL) which provides axiomatic representation of the data via the axiomatic view module 232. The OWL DL semantic web language is a web ontology language that in many ways corresponds with description logic. The OWL DL semantic web language enables expressiveness while retaining computational completeness, decidability, and an availability of practical reasoning algorithms. The OWL DL semantic web language includes all OWL language constructs. The infrastructure management system 150 performs constraint and consistency checking as well as inferencing on the topic map 210. More specifically, in certain embodiments, the constraint and consistency checking are performed using a standard web based query mechanism on the OWL-DL representation of the topic map 210. The infrastructure management system 150 constructs reliable, adaptable reference models of instance data using belief based probability operations.

Figure 3:
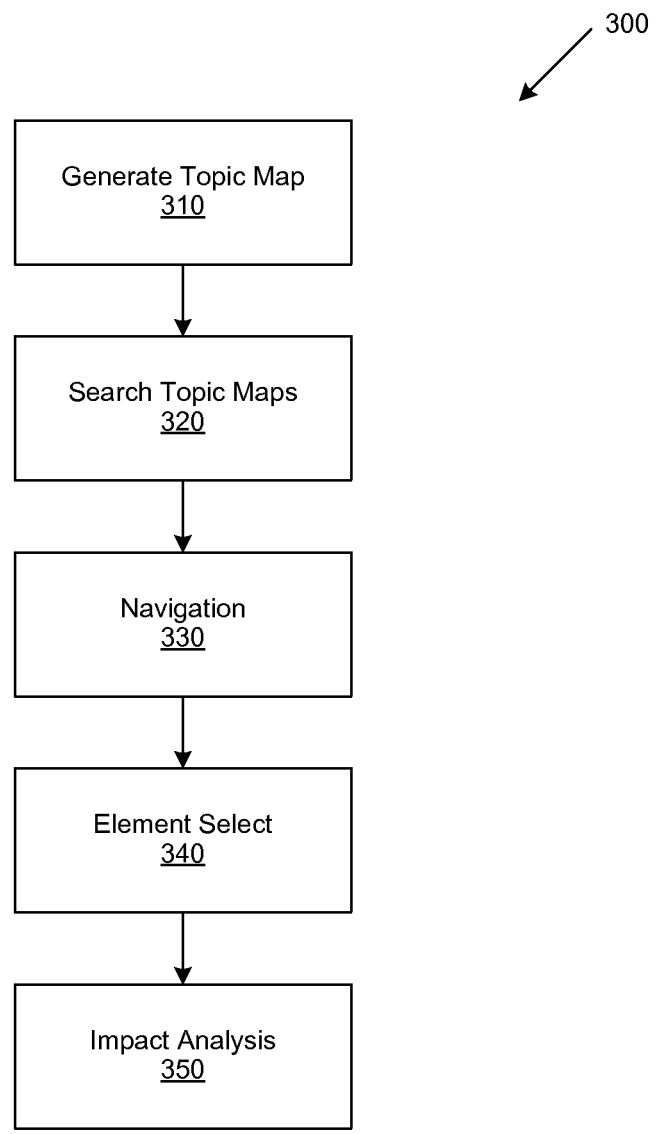
FIG. 3 is a generalized flowchart of the operation of an infrastructure management system.

Referring to FIG. 3, a generalized flowchart of the operation of the infrastructure management system 150 is shown. More specifically, during generate topic map step 310, the infrastructure management system indexer 240 generates a topic maps index for the infrastructure system. During the generate topic maps step 310, the infrastructure management system indexer 240 generates topics, merges the same topics, identifies associations between topics and associates the topics based upon the associates.

In certain embodiments, the infrastructure management system 150 includes an intelligent water framework such as the Intelligent Operations for Water (IOW) implementation available from International Business Machines, Inc. With an intelligent water framework such as the IOW implementation, command (cmd) based tools are used to generate the topic maps based on an infrastructure system model which is stored within an infrastructure system model server.

Next, during search topic maps step 320, a user performs search on the topic maps, select the interested elements, and start navigation of the infrastructure management system. In certain embodiments, the navigation may be performed using the management dashboard 210. Next, during navigation step 330, a user can follow any identified associations and navigate within the topics maps.

Next, during element select step 340, a user selects an element from the topic map. Upon selecting the element, the infrastructure system management system accesses information regarding the occurrence of the element and allows the user to view the occurrence of the element. For example, for a pipe, the user can view more details about the element from a SCADA system, an enterprise asset management system, GIS, etc.

Next, at impact analysis step 350, the infrastructure management system performs an impact analysis on the topic maps. In certain embodiments, the impact analysis uses a depth first search operation to identify impacted customer accounts if a pipe is broken by, e.g. using a shortest path operation to determine connectivity between two pipes.

Figure 4:
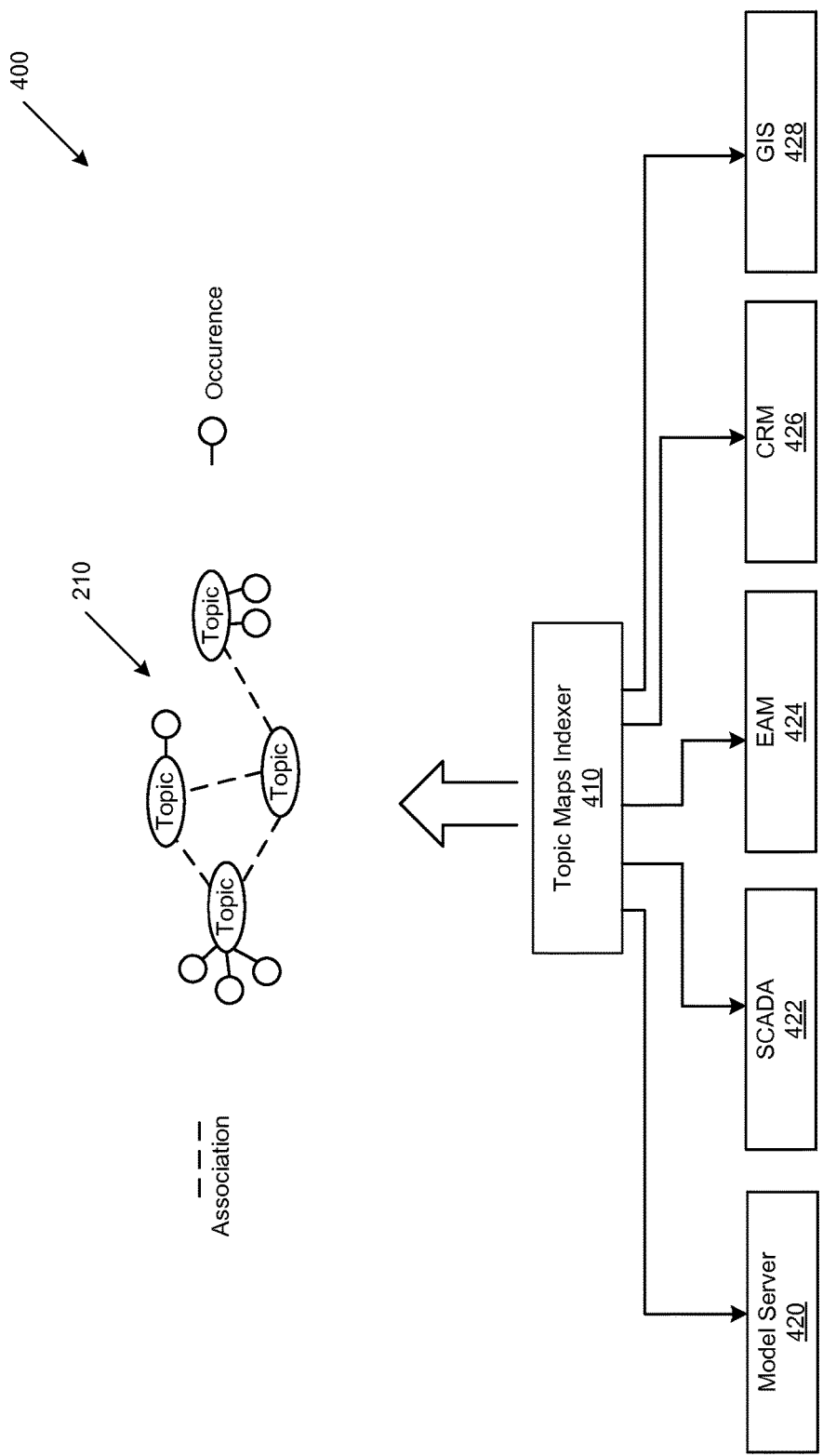
FIG. 4 is a generalized block diagram of the interactions of the various systems with the infrastructure management system.

FIG. 4 is a generalized block diagram of the interactions of the various systems with the infrastructure management system 150. More specifically, the infrastructure management system 150 receives input from a model server 410, a SCADA 420, an enterprise asset management system 430, a CRM system 440 and a GIS system 450. The infrastructure management system indexer 226 uses the information received from the model server 410, the SCADA 420, the enterprise asset management system 430, the CRM system 440 and the GIS system 450 to dynamically generate a topic maps index.

More specifically, in certain embodiments, the model server 420 provides a water model and a hydraulic model to the infrastructure management system. The SCADA system 422 is a type of industrial control system (ICS). An ICS is a computer controlled system that monitors and controls industrial processes that exist in the physical world. A SCADA system typically controls large scale processes that can include multiple sites and large distances. The EAS system 424 provides information regarding a whole life optimal management of the physical assets of an organization (e.g., the infrastructure). The EAS system 424 tracks information such as the design, construction, commissioning, operations, maintenance and decommissioning/replacement of plant, equipment and facilities. The CRM system 426 manages a company's interactions with current and future customers. The CRM system 426 typically executes on a computer system to organize, automate, and synchronize sales, marketing, customer service, and technical support. The GIS system 428 captures, stores, manipulates, analyzes, manages, and presents all types of geographical data.

For example, if the SCADA system 422 generates an indication that water level in sewer C142 is rising unusually high, it is very useful to also know that C142 is located at the corner of Maple and Main (information that may be obtained from the GIS system 428) and that the sewer was last serviced by Crew #4 six months ago (information that may be gleaned from an EAM system 424). From the GIS system 428, the infrastructure management system 150 may also be able to predict that should the sewer overflow, it will impact the roads and other equipment that are geographically proximate as well. From the CRM system 426, the infrastructure management system 150 can apprise the Smith family, who live on Maple Street, that they should boil their water to compensate for the level of the sewer.

Infrastructure management system 150 processes topic maps such as the topic map 210 as mathematical graphs. Using a graph representation, the infrastructure management system 150 can perform impact analysis and network optimization using graph theory operations. The infrastructure management system 150 can also use set theory to leverage topic map support for scope which allows the infrastructure management system 150 to filter, rank and select content based on context. The infrastructure management system 150 also represents the topic map using sematic web technology which allows axiomatic representation of the data within the infrastructure. By using the axiomatic representation of the topic maps, the infrastructure management system 150 can perform constraint and consistency checking as well as inferencing of new data. Additionally, the infrastructure management system 150 leverages Bayesian probabilities and Bayesian networks to generate belief based reference models from the instance data. Using a topic map view allows a user to obtain information about a particular node within an infrastructure network. For example, accessing a node allows a user to obtain information regarding surrounding nodes as well as all other connections of which the node is a part.

Figure 5:
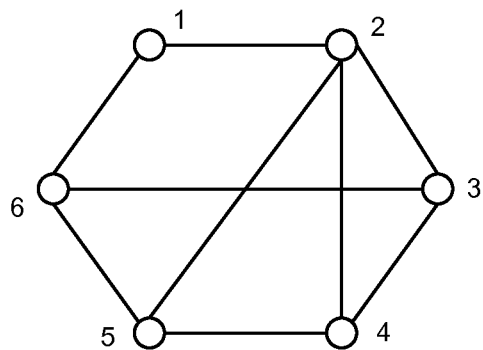
FIG. 5 shows a block diagram of an example topic map graph.

For example, referring to FIG. 5, a block diagram of an example topic map graph 500 is shown. When processing the topic map 210, a graph corresponding to the topic map is generated. The graph is defined as a couple (V,E) where V is the set of vertices or nodes (i.e., abstraction of a topic or an occurrence within the topic map) and E is the set of edges (i.e., the association between topics or the relationship between a topic and one or more occurrences).

For the example shown in FIG. 5, V={1,2,3,4,5,6} and E={{1,2}, {1,6}, {2,3}, {2,4}, {2,5}, {3,4}, {3,6}, {4,5}, {5,6}}. A subgraph is a partial graph of G=(V,E) such that G[F]=(V,F) where F is a subset of E. A tree is a connected graph without cycle. Distances correspond to the length of a path or a cycle is the number of edges a path contains.

Figure 6:
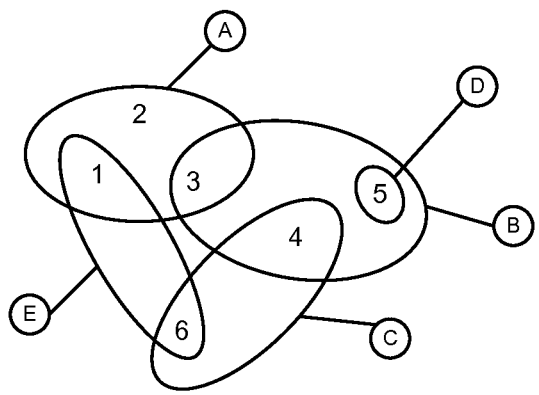
FIG. 6 shows a block diagram of a hypergraph of an example topic map graph.

A hypergraph is a generalization of a graph where an edge is incident with an unspecified number of vertices. For example, referring to FIG. 6, a block diagram of an example hypergraph 600 is shown. A hyergraph H is a pair H=(X,Y) where X is a set of vertices and Y is a set of non-empty subsets of hyperedges. For the example shown in FIG. 6, X={1,2,3,4,5,6} and Y={A, B, C, D, E} where A={1, 2, 3}, B={3, 4, 5}, C={4, 6}, D={5} and E={1, 6}.

Figure 7:
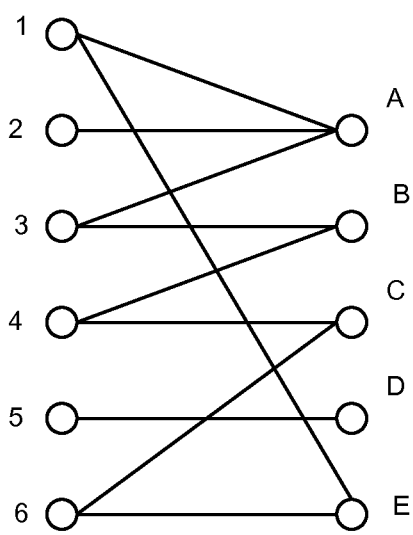
FIG. 7 shows a block diagram of another example hypergraph of an example topic map.

FIG. 7 shows a block diagram of an example an application of a hypergraph of an example topic map. More specifically, the application (anti-lift) associates a set of the hypergraph elements to a vertex (i.e., a topic). The anti-lift defines a semantic characterization (instance of, scope) of the hypergraph elements by a topic.

Figure 8:
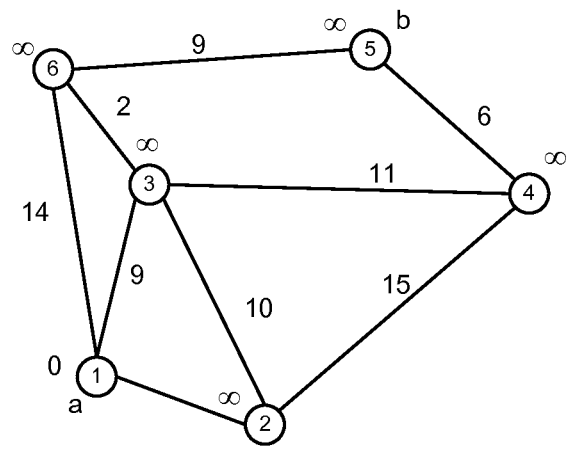
FIG. 8 shows a block diagram of an example graph representation of a shortest path operation.

Using a graph view, such as a topic map, of an infrastructure system, it is possible to perform an impact analysis on nodes within the topic map. The impact analysis enables a user to identify the impact of a change or event to a node on the infrastructure system using graph search operations. In certain embodiments, the infrastructure management system 150 may perform one or both of a shortest path analysis and a depth first search analyses. FIG. 8 shows a block diagram of an example graph representation of a shortest path operation. The shortest path operation is a graph search operation that determines a single source shortest path for a graph with non negative edge path costs. The shortest path operation produces a shortest path tree. The shortest path operation may be used by the infrastructure management system 150 for routing within the infrastructure system.

Figure 9:
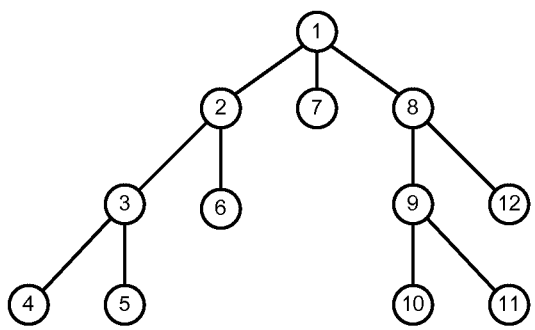
FIG. 9 shows a block diagram of a depth first search operation when performed on an example graph.

FIG. 9 shows a block diagram of a depth first search (DFS) operation when performed on an example graph. The DFS operation traverses or searches a structure such as a tree, tree structure or graph. The DFS operation starts at a root (selecting some node as a root in the graph) and explores the structure as far as possible along each branch of the structure before backtracking.

Figure 10:
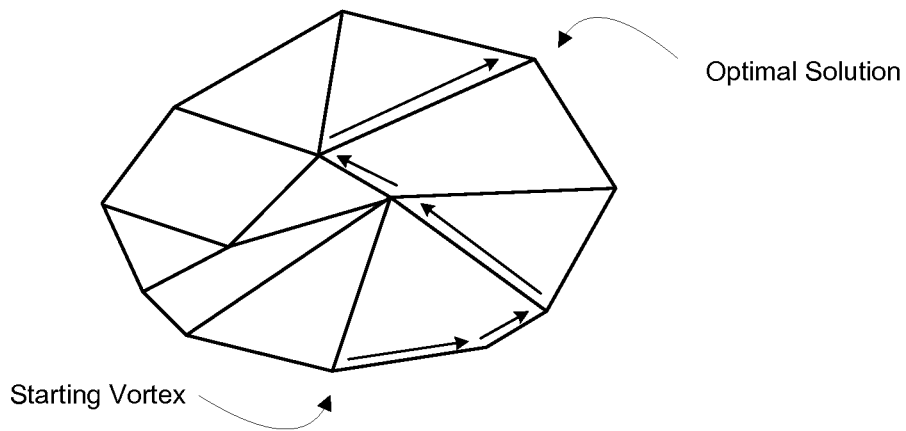
FIG. 10 shows a block diagram of an example graph version of a simplex operation.

The infrastructure system 150 performs impact analysis using graph theory operations such as network optimization. FIG. 10 shows a block diagram of an example graph version of a simplex operation. More specifically, in mathematical optimization theory, a simplex operation numerically solves linear programming issues. The simplex operation may also be applied to graphs such as topic maps. Important infrastructure management issues can be formulated in terms of linear programming and can allow the determination of maximal flows, optimal flows, shortest paths and optimal circulations.

A graph version of a simplex operation referred to as a network simplex operation may be used to effectively solve a minimum cost flow problem which is an important issue in infrastructure management. An MCF framework may be used to model more specialized infrastructure issues including assignment, Transportation and Trans-shipment, shortest path and maximum flow.

The infrastructure management system 150 also applies scope and set theory when managing an infrastructure. Names, occurrences and roles played in associations are all examples of characteristics that can be assigned to a topic within the topic map. Assigning such a characteristic a topic makes an assertion about the topic. The purpose of scope is to express the limits within which such assertions (or characteristic assignments) have validity. For example, a name may only be applicable in some contexts. An occurrence might be pertinent in some situations but not in others. An association might state an opinion that is not shared by others. One powerful application of scope is to permit different world views of a subject. This is important when merging topic maps as knowledge of which assertions came from which source can be retained. The individual names, occurrences and associations can be scoped so as to indicate from where they originated.

Scope may be conceptualized in terms of mathematical sets. Expressing context relevant information in terms of scope allows a subset of a topic map to be generated where the subset itself is also a topic map. Scope can be used by the infrastructure management system to perform a plurality of functions. For example, scope can be used to perform filtering, defined as the removal of irrelevant topic characteristics, ranking, defined as an ordering of characteristics according to relevance, and selecting, defined as choosing a characteristic for a given situation.

Because scope and context may be expressed in terms of sets of topics or themes, scope and context may be filtered and evaluated via operations on sets. For example, give two (non-empty) sets of a certain type of scope and a certain context, set A and set B respectively, there are a plurality of relationships between the sets. More specifically, set A may be a superset of set B (i.e., scope is a superset of the context); set A may be a subset of set B (i.e., scope is a subset of the context); set a is a superset of set B AND set a is a subset of set B (i.e., scope is both a superset and a subset of the context); set a is a superset of set B OR set A is a subset of set B (i.e., scope is either a superset or a subset of the context); and the intersection of set A and set B is non-empty (i.e., scope and context have a non-empty intersection). When filtering with scope, unconstrained scope and unspecified context are not considered.

Another desirable operation on topic characteristics that relates to scope is ranking. Some characteristics (i.e., occurrences) may be more relevant for a certain user than others. The other characteristics may not be completely irrelevant, merely of less interest. Accordingly, a ranking operation provides a way to represent certain characteristics with more prominence and others with less prominence. This representation may take the form of a list of occurrences where the more relevant occurrences appear towards the top of the list.

When a topic map is converted into a semantic web technology (such as a web ontology language (OWL) such as OWL-DL) an axiomatic representation of the data within the topic map is provided. This semantic web technology comprises a set of design principles and a variety of enabling technologies. More specifically, the semantic web technology may include a resource description framework (RDF) a variety of data interchange formats and notations such as those used within OWL, all of which provide a formal description of concepts, terms and relationships within a given infrastructure system.

The OWL web ontology language is used by the infrastructure management system 150 to process the content of information rather than just presenting the information. OWL facilitates greater machine interpretability of content than that supported by XML, RDF and RDF-Schema (RDF-S) by providing additional vocabulary along with formal semantics. Versions of OWL that may be used by the infrastructure management system 150 include OWL Lite, OWL Dl and OWL Full.

By generating topic maps with an ability to convert to a web ontology language, topic maps may be imbued with a plurality of web ontology capabilities. More specifically, using a web ontology language ensures topic map compliance by enabling consistency checking and automatic inferencing. Additionally, providing a topic map with a web ontology language allows standard query languages to be used when performing queries on the topic map.

The infrastructure management system 150 also includes an ability to process the topic map information using belief based probability so as to allow the building of reliable, adaptable reference models from instance data. More specifically, the infrastructure management system 150 applies Bayesian network theory to a topic map to map concepts from one domain with a set of concepts in another domain. Such an operation allows the infrastructure management system 150 to apply a statistical or probability model to a topic map and generate a belief model of the topic map. The infrastructure management system 150 uses Bayesian probabilities to measure a state of knowledge of a system. The Bayesian probabilities specify some prior probability which is then updated in light of new relevant data within the topic map.

Given some data and some hypothesis, the posterior probability that the hypothesis is true is proportional to the product of the likelihood multiplied by the prior probability. The infrastructure management system 150 represents the variables associated with the probabilities in an acyclic graph. The Bayesian network represents probabilistic events as nodes in a directed acyclic graph, in which the likelihood of an event may be calculated from the likelihoods of its predecessors in the directed acyclic graph.

Although the present invention has been described in detail, it should be understood that various changes, substitutions and alterations can be made hereto without departing from the spirit and scope of the invention as defined by the appended claims.

What is claimed is:

1. A water system comprising:
   a plurality of deployed pipes;
   a plurality of deployed junctions;
   a plurality of deployed pressure valves, with each pressure valve of the plurality of deployed pressure valves belonging to a respectively corresponding pressure management zone of a plurality of management zones;

a plurality of instruments structured to provide a plurality of instrument readings respectively corresponding to parameter values for parameters related to operation of the water system;

an inventory including undeployed pipes, undeployed junctions, and undeployed pressure valves; and a computer sub-system including a storage device set, a processor; a data bus coupled to the processor; and a computer-usable medium embodying computer program code, the computer-usable medium being coupled to the data bus, the computer program code comprising instructions executable by the processor and configured for:

receiving, by the computer sub-system, a supervisory control and acquisition (SCADA) data set including information indicative of parameter values respectively corresponding to the plurality of instrument readings provided by the plurality of instruments;

receiving, by the computer sub-system, an enterprise asset management (EAM) data set including (i) inventor information relating to inventor; (ii) maintenance information relating to maintenance of the deployed pipes, deployed junctions and the deployed pressure valve;

receiving, by the computer sub-system, a geographic information system (GIS) data set including information indicative of a spatial mapping of the water system including spatial mapping of the deployed pipes, a spatial mapping of the deployed junctions and a spatial mapping of the deployed pressure valves;

receiving, by the computer sub-system, a customer relations management (CRM) data set, including information relating to customer accounts for a plurality of customers, with information relating to each given customer including at least water usage by the given customer account;

generating, by the computer sub-system, topic map model for the water system, with the topic map including at least: (i) the information from the SCADA data set, (ii) the information from the EAM data set, (iii) the information from the GIS data set, and (iv) the information from the CRM data set;

storing, by the computer sub-system, the topic map in computer readable form on the storage device set;

receiving, by the computer sub-system, a proposed change data set including information indicative of a proposed change to one, or more portions of the water system; and performing, by an infrastructure management sub-subsystem of the computer sub-system, impact analysis using graph theory operations and based on the topic map and the proposed change to generate impact analysis output data.

2. The system of claim 1, further comprising making a change to the deployed pipes, deployed junctions, the deployed pressure valves and/or the inventor based upon the impact analysis output data.

3. The system of claim 2, wherein the changing includes replacing a deployed pipe with an undeployed pipe from inventory.

4. The system of claim 2, wherein the changing includes replacing a deployed pressure valve with an undeployed pressure valve from the inventory.

5. The system of claim 2, wherein the changing includes replacing a deployed junction with an undeployed junction from inventory.

6. A water system comprising:

a plurality of deployed pipes;

a plurality of deployed junctions;

a plurality of deployed pressure valves, with each pressure valve of the plurality of deployed pressure valves belonging to a respectively corresponding pressure management zone of a plurality of management zones;

a plurality of instruments structured to provide a plurality of instrument readings respectively corresponding to parameter values for parameters related to operation of the water system;

an inventory including undeployed pipes, undeployed junctions, and undeployed pressure valves; and a computer sub-system including a storage device set;

receiving, by the computer sub-system, a supervisory control and acquisition (SCADA) data set including information indicative of parameter values respectively corresponding to the plurality of instrument readings provided by the plurality of instruments;

receiving, by the computer sub-system, an enterprise asset management (EAM) data set including (i) inventor information relating to inventor; (ii) maintenance information relating to maintenance of the deployed pipes, deployed junctions and the deployed pressure valve;

receiving, by the computer sub-system, a geographic information system (GIS) data set including information indicative of a spatial mapping of the water system including spatial mapping of the deployed pipes, a spatial mapping of the deployed junctions and a spatial mapping of the deployed pressure valves;

receiving, by the computer sub-system, a customer relations management (CRM) data set, including information relating to customer accounts for a plurality of customers, with information relating to each given customer including at least water usage by the given customer account;

generating, by the computer sub-system, a topic map model for the water system, with the topic map model including at least: (i) the information from the SCADA data set, (ii) the information from the EAM data set, (iii) the information from the GIS data set, and (iv) the information from the CRM data set;

storing, by the computer sub-system, the topic map in computer readable form on the storage device set; and performing, by an infrastructure management sub-subsystem of the computer sub-system, and network optimization for the water system using graph theory operations and based on the topic map to generate water system optimization output data.

7. The system of claim 6, further comprising making a change to the deployed pipes, the deployed junctions, the deployed pressure valves and/or the inventory based upon the water system optimization output data.

8. The system of claim 7, wherein the changing includes replacing a deployed pipe with an undeployed pipe from the inventory.

9. The system of claim 7, wherein the changing includes replacing a deployed pressure valve with an undeployed pressure valve from the inventory.

10. The system of claim 7, wherein the changing includes replacing a deployed junction with an undeployed junction from the inventory.

11. A water system comprising:
- a plurality of deployed pipes;
- a plurality of deployed junctions;
- a plurality of deployed pressure valves, with each pressure valve of the plurality of deployed pressure valves belonging to a respectively corresponding pressure management zone of a plurality of management zones;
- a plurality of instruments structured to provide a plurality of instrument readings respectively corresponding to parameter values for parameters related to operation of the water system;
- an inventory including undeployed pipes, undeployed junctions, and undeployed pressure valves; and
- a computer sub-system including a storage device set:
  - receiving, by the computer sub-system, a supervisory control and acquisition (SCADA) data set including information indicative of parameter values respectively corresponding to the plurality of instrument readings provided by the plurality of instruments;
  - receiving, by the computer sub-system, an enterprise asset management (EAM) data set including (i) inventor information relating to inventor; (ii) maintenance information relating to maintenance of the deployed pipes, deployed junctions and the deployed pressure valve;
  - receiving, by the computer sub-system, a geographic information system (GIS) data set including information indicative of a spatial mapping of the water system including spatial mapping of the deployed pipes, a spatial mapping of the deployed junctions and a spatial mapping of the deployed pressure valves;
  - receiving, by the computer sub-system, a customer relations management (CRM) data set, including information relating to customer accounts for a plurality of customers, with information relating to each given customer including at least water usage by the given customer account;
  - generating, by the computer sub-system, a topic map model for the water system, with the topic map including at least: (i) the information from the SCADA data set, (ii) the information from the EAM data set, (iii) the information from the GIS data set, and (iv) the information from the CRM data set;
  - storing, by the computer sub-system, the topic map in computer readable form on the storage device set with the topic map, with the topic map being in the form of a Bayesian network;
  - receiving, by an infrastructure management sub-sub system of the computer sub-system, a Bayesian probability data set including information indicative of a plurality of Bayesian probability values; and
  - generating, by an infrastructure management sub-sub-system, a belief based reference model based on the topic map and the plurality of Bayesian probability values.

* * * * *